United States Patent [19]
deVries

[11] 3,948,839
[45] Apr. 6, 1976

[54] FLATTING AGENTS
[75] Inventor: Edward R. deVries, Lebanon, N.J.
[73] Assignee: Unifilm Corporation, Somerville, N.J.
[22] Filed: Feb. 14, 1974
[21] Appl. No.: 442,364

Related U.S. Application Data
[62] Division of Ser. No. 365,827, June 1, 1973, Pat. No. 3,865,899.

[52] U.S. Cl.... 260/29.4 R; 260/29.2 E; 260/29.2 N; 260/30.2; 260/30.4 R; 260/30.4 N; 260/30.8 DS; 260/31.2 N; 260/31.2 XA; 260/32.6 NA; 260/32.6 R; 260/32.8 R; 260/33.4 R; 260/33.6 R; 260/33.8 R; 260/34.2; 260/75 T; 260/75 TN; 260/29.4 OA; 260/77.5 CH; 260/849; 260/850; 260/856; 260/857 R; 260/858; 260/873
[51] Int. Cl.² C08K 3/00; C08L 67/00; C08L 79/00
[58] Field of Search ......... 260/34.2, 29.2 R, 29.2 E, 260/29.2 N, 29.1 R, 29.4 R, 29.4 OA, 75 NK, 75 TN, 77.5 CH, 849, 856, 859

[56] References Cited
UNITED STATES PATENTS
3,652,472  3/1972  Clarke et al. ...................... 260/34.2
FOREIGN PATENTS OR APPLICATIONS
586,489  11/1959  Canada .............................. 260/34.2
967,051  8/1964  United Kingdom ................ 260/34.2

*Primary Examiner*—Allan Lieberman
*Attorney, Agent, or Firm*—Brumbaugh, Graves, Donohue & Raymond

[57] ABSTRACT

Flatting compositions for forming dull coatings which have improved resistance to change in gloss or flatness when subjected to elevated temperatures comprise fine size flatting agent particles of an in situ prepared cross-linked organic polymer. Flatted coating compositions are formed by cross-linking this modified organic polymer particle in dry form, or dispersed in an inert liquid medium, when added to a solubilized film-forming organic binder.

5 Claims, No Drawings

FLATTING AGENTS

This is a division of application Ser. No. 365,827, filed June 1, 1973, now U.S. Pat. No. 3,865,899.

The present invention relates to flatting compositions.

In order to provide protection and to produce a pleasing appearance, a variety of surfaces such as wood, metal, fabric, paper or plastics, are coated with clear flatting compositions containing dispersed or suspended particles of a flatting agent which reduces the gloss or sheen of the coating and the coated substrate, preferably without substantially reducing the transparency of the flat coating. For example, wood finishes which serve to protect the surface against abrasion and stain, yet do not conceal the beauty of the grain, are made to simulate desirable hand-rubbed finishes by incorporating flatting agents therein which normally are dispersed fine particles of such materials as silicas. The best effects are obtained with silicas of uniform particle size down to the submicron range. Small size and uniformity are necessary to achieve a smooth coating without white specks or without a graying effect which would detract from the appearance of the coating.

The same considerations apply, for example, to vinyl-coated fabrics, especially those which have a metallic colored coating thereon such as is common in automotive upholstery. A flat top coat is applied thereover to reduce gloss and to protect the colored coating, preferably with only minor changes in the apparent color, and no loss of metallic appearance.

There are many other similar commercial applications for flat coatings obtained from flatting compositions.

Widely used flatting agents for flatting compositions are finely divided particles of silicas, silicates, insoluble urea-formaldehyde resins, vinyl plastisol resins, polyethylene and polypropylene.

Each one of these flatting agents possesses undesirable features in certain applications which limit its usefulness. For example, silicas in a flat top coat for furniture upholstery can cause whitening when the upholstery is stretched during application; vinyl plastisol resins cannot be used in flatting compositions containing common coating solvents because they swell or dissolve the vinyl resin; polyethylene and polypropylene not only are inefficient flatting agents, requiring relatively large quantities thereof to reduce the gloss of a flat coating or flat coated substrate, but they also exhibit poor adhesion to most coating or binder materials therefor, which shows up as whitening on stretching or scratching of the coating.

Burnishing, which is the increase in gloss of a flat coating containing a flatting agent when it is rubbed, is a persistent problem with the duller flat coatings. Moreover, a number of presently suggested flatting agents impart inadequate abrasion resistance to flat protective coatings made from flatting compositions containing such flatting agents.

In my copending U.S. application Ser. No. 177,160, filed Sept. 1, 1971, (now U.S. Pat. No. 3,737,402) there are disclosed a variety of desirable flatting compositions. A particularly advantageous variation of those flatting compositions is one wherein the flatting composition comprises fine size flatting agent particles of a nylon or polyester organic polymer containing reactive hydrogen groups dispersed in a liquid dispersion medium having therein a solubilized film-forming organic binder chemically reactive with the flatting agent. Such a flatting composition can be prepared, for example, by dissolving at an elevated temperature the chemically reactive nylon or polyester organic polymer, in a solvent system comprising a strong organic solvent for the chemically reactive nylon or polyester flatting agent at the elevated temperature and a common coating solvent for the chemically reactive film-forming organic binder and then cooling the resulting solution to room temperature to precipitate the polyester or nylon organic polymer as suspended discrete fine size flatting agent particles. This dispersion is mixed with the chemically reactive film-forming organic binder to form a flatting composition. When such a flatting composition is applied to a substrate and then heat cured or thermoset, the chemically reactive flatting agent particles react with the chemically reactive film-forming organic binder and thereby become an integral part of the dull coating. The resultant dull coating has improved abrasion resistance. However, such flatting compositions are limited to the use therein of a film-forming organic binder which is chemically reactive with the flatting agent particles upon heat curing or thermosetting of the coated flatting composition.

In accordance with the present invention there are provided flatting compositions wherein the film-forming organic binder component need not be one which is chemically reactive with the flatting agent particles. Moreover, the flatting compositions of the present invention form dull coatings having improved resistance to change in gloss or flatness when subjected to elevated temperatures such as are encountered in baking schedules and in the dielectrically heat-sealing of vinyl fabrics coated therewith.

Broadly, the flatting compositions of the invention comprise fine size flatting agent particles of an in situ prepared cross-linked organic polymer dispersed in an inert liquid dispersion medium having therein a solubilized compatible film-forming organic binder. More specifically, the flatting compositions of the invention comprise (1) dispersed discrete flatting agent particles having a fine size range from about 0.02 to about 10 microns of the in situ prepared cross-linked reaction product of (a) a crystalline, thermoplastic polar nylon or polyester organic polymer containing reactive hydrogen groups and having a softening point of from about 120°C. to about 240°C. which is insoluble in common coating solvents for film-forming organic binders and soluble only at elevated temperatures in strong organic solvents for said organic polymer and (b) a cross-linking agent chemically reactive with said organic polymer and containing chemically reactive isocyanate or methylol groups; (2) a solubilized compatible film-forming organic binder; and (3) an inert liquid dispersion medium comprising (c) a common coating solvent for the compatible film-forming organic binder in which said organic polymer and said cross-linked reaction product are insoluble and (d) a strong organic solvent for said organic polymer in which the organic polymer is soluble only at elevated temperatures and in which said cross-linked reaction product is insoluble.

In regard to the components which are generally utilized in preparing the flatting compositions of the invention, the preferred nylon or polyester organic polymer component has an acid and/or hydroxyl number of 2 or 4 or higher and therefore contains reactive hydrogen groups, namely, amide, carboxyl or hydroxyl groups. Representative of the nylons are nylon-6,10, i.e., the copolymer of hexamethylene diamine with sebacic acid; nylon-6, i.e., polycaprolactam; nylon-6,6, i.e., the copolymer of hexamethylene diamine with adipic acid; and the like. Typical suitable polyesters include the condensate of ethylene glycol with a mixture of dibasic carboxylic acids comprising terephthalic acid and isophthalic acid, which mixture of dibasic carboxylic acids can also contain aliphatic dicarboxylic acids such as adipic acid and sebacic acid.

The cross-linking agent component chemically reactive with the preferred nylon or polyester organic polymer component usually contains chemically reactive isocyanate or methylol groups. Typical examples thereof include 2,4-toluene diisocyanate, 4,4'-diphenyl methane diisocyanate, isocyanate terminated polyester having an isocyanate value of approximately five, hexamethylene diisocyanate trimer, hexamethylol melamine, and the like.

The compatible film-forming organic binder component preferably is a vinyl chloride polymer, such as polyvinyl chloride or copolymers of vinyl chloride and vinyl acetate containing a predominant amount of the vinyl chloride monomer. However, other suitable film-forming organic binders can be used such as polymethylmethacrylate.

Common coating solvents for film-forming organic binders and strong organic solvents for organic polymers, referred to above in regard to their solubilizing properties, are conventional materials well known to the coating art. Thus, typical examples of the first type of solvent include the lower aliphatic hydrocarbons, such as hexane and octane; the lower aromatic hydrocarbons, such as toluol and xylol; the lower alkanols, such as ethanol and butanol; the lower aliphatic ketones, such as acetone and methyl ethyl ketone; the lower aliphatic esters, such as ethyl acetate and butyl acetate; the chlorinated lower aliphatic hydrocarbons, such as methylene chloride and trichloroethylene; as well as water. Representative examples of the second type of solvent include tetrahydrofuran, N-methyl pyrrolidone ("M-Pyrol"), N-methyl morpholine, cyclohexanone, dimethyl formamide, dimethyl sulfoxide, dioxane and butyrolactone.

The amounts of the various components utilized in preparing the flatting compositions of the invention are not a critical feature thereof and will vary depending primarily upon the chemical nature of the components selected and the particular desired properties for the flatting compositions. In general, the strong organic solvent for the preferred nylon or polyester organic polymer is used in an amount at least sufficient to solubilize the organic polymer at an elevated temperature and the common coating solvent for the film-forming organic binder is used in an amount at least sufficient to solubilize the film-forming organic binder. The compatible film-forming organic binder is present in the flatting compositions in an amount sufficient to form an adherent dull coating of the flatting composition on a substrate. The cross-linking agent which is chemically reactive with the nylon or polyester organic polymer is used in an amount sufficient to cross-link that polymer to the extent desired. The flatting agent particles of the in situ prepared cross-linked reaction product of the nylon or polyester organic polymer cross-linked with the cross-linking agent therefor are present in the flatting compositions in an amount sufficient so as to form dull coatings therefrom as the desired degree of flatness. As a general rule, the flatting agent is present in the flatting compositions in an amount from about 5 to about 35% by weight based on the weight of the compatible film-forming organic binder. Typical representative amounts of the components used in preparing the flatting compositions are illustrated by the working examples set forth hereinafter.

The flatting compositions can be further modified and improved by incorporating therein small quantities of the order of a few weight percent of additives. For example, dispersing agents such as metallic naphthenates may be used as deflocculating agents and aid in keeping the flatting agent in suspension or dispersed particulate state. Also small amounts of heat and light stabilizers for vinyl polymers can be present in the flatting compositions.

The flatting compositions of the invention can be prepared, for example, by dissolving the requisite organic polymer in a solubilizing amount of the above-mentioned strong organic solvent for organic polymers at an elevated temperature, i.e., normally above 80°C. and more usually at about 120° to about 150°C. or higher. The strong organic solvent must be capable only at an elevated temperature of dissolving the particular organic polymer used and hence is selected from among the above-mentioned strong organic solvents with this objective or property in mind. After the solution is formed, there is added thereto one or more of the above-mentioned common coating solvents for the compatible film-forming organic binders in which the organic polymer is insoluble and the solution allowed to cool to room temperature, i.e., about 20°C. During cooling the organic polymer precipitates as discrete, dispersed or suspended fine size particles, rather than agglomerated or gel or flocculant particles. Thereafter, the cross-linking agent is added to the resultant dispersion and reacted with the chemically reactive organic polymer particles. This cross-linking reaction can be effected at room temperature or at elevated temperatures depending upon the reactivity of the cross-linking agent and the reactive organic polymer and further depending upon the extent of cross-linking desired. At the conclusion of the cross-linking reaction the flatting composition contains the in situ prepared cross-linked reaction product of the reactive organic polymer with the cross-linking agent in the form of dispersed discrete flatting agent particles in the above-mentioned fine size range. The compatible film-forming organic binder is then added, if not earlier added, to complete the flatting composition.

The flatting compositions of the invention can be applied to substrates such as fabric, wood, paper, metal, plastics and the like, by conventional means including spraying, brushing, roll-coating and spreading.

The flatting compositions of the invention and their method of preparation will be further illustrated by the following representative examples thereof.

In Example 1 below, Parts A and B are preliminary preparations while Part C is a comparative flatting composition and Part D is a flatting composition of the invention.

EXAMPLE 1

Part A

Dispersed polyester particles were prepared by dissolving 100 grams of a crystalline, thermoplastic, polar ethylene glycol terephthalate-isophthalate polyester having a softening point of 140°C. and a hydroxyl value of approximately 4 in 100 grams of N-methyl pyrrolidone at 150°C. Then 200 grams of toluol were added slowly. When cooled to room temperature, the product was a soft, pasty solid containing polyester particles in the 0.5–4 micron range.

Part B

The paste from Part A was dispersed in 480 grams of methyl ethyl ketone and 192 grams of a 50% solution of isocyanate-terminated polyester, in ethyl acetate, having an isocyanate value of approximately 5, was added along with 0.05% by weight of stannous octoate. After thorough mixing, the mixture was allowed to stand overnight to effect cross-linking of the polyester particles. The product then was subjected to high shear to form a smooth dispersion.

Part C

The paste of Part A was dispersed in a solution of vinyl chloride-vinyl acetate copolymer and polymethylmethacrylate in methyl ethyl ketone. The resulting flatting composition was applied to vinyl coated fabric. It had excellent abrasion resistance; however, when dielectrically heat-sealed at about 157°C., the sealed area became glossy, an undesirable change.

Part D

The dispersion of Part B was admixed with a solution of vinyl chloride-vinyl acetate copolymer and polymethylmethacrylate in methyl ethyl ketone. The resulting flatting composition was applied to vinyl coated fabric. It had excellent abrasion resistance; when dielectrically heat-sealed at about 157°C., the sealed area did not change in gloss or flatness.

EXAMPLE 2

A crystalline, thermoplastic polar ethylene glycol terephthalate-isophthalate-sebacate polyester with a softening point of 135° to 140°C., and a hydroxyl value of 10, was converted to dispersed fine size particles by dissolving it in N-methyl pyrrolidone and toluol at 150°C. and precipitating it by adding acetone and cooling. One hundred parts of this dispersion at 20% solids was treated with 10 parts of hexamethylol melamine and 0.5 parts of butyl phosphoric acid. After heating at 50°C. for 4 hours, a reacted polyester dispersion was obtained. The cross-linked polyester solids of this dispersion did not melt on a hot plate at 200°C. thereby showing the increase in softening point, whereas the untreated polyester dispersion melted to a clear liquid.

EXAMPLE 3

A crystalline, thermoplastic, polar nylon-6,10 having a softening point of 165° C. to 170°C. was dissolved in dimethyl formamide at 150°C., to form a 50% solids solution. To 100 grams of this hot solution was added 250 grams of toluol and then 250 grams of acetone. On cooling to room temperature, a stable white dispersion of nylon particles in the 1 to 10 micron range was obtained.

This dispersion was diluted with an equal volume of toluol and treated with up to 10% by weight of hexamethylene diisocyanate trimer, and 0.1% of stannous octoate. After allowing the reaction to proceed for 24 hours a stable fluid dispersion was obtained.

A comparison of the two nylon dispersions in a thermosetting acrylic baking enamel showed that the pre-reacted nylon dispersion gave coatings whose gloss was not affected by different baking schedules. The untreated nylon dispersion gave coatings whose gloss decreased with increased time and temperature of baking, making the gloss impractical to control.

EXAMPLE 4

Results similar to those in Example 3 were obtained with the treated and untreated polyester dispersions of Example 2, when they were used in a thermosetting polyester-melamine resin coating. The treated polyester dispersion allowed close control of gloss independent of baking conditions.

EXAMPLE 5

The in situ cross-linked dispersion prepared in Part B of Example 1 is filtered and washed with toluol. The resultant press cake is dried and ground to a fine powder. This powder can then be dispersed in any film-forming composition; other known means of separating the solids, such as spray drying, centrifuging, etc., may be used.

From the comparative data set forth above, it will be noted that the in situ prepared cross-linked organic polymer flatting agent particles present in the flatting compositions of the invention have an increased softening point and hence an increased molecular weight compared with their precursor particles. Moreover, the flatting compositions of the invention thereby have increased abrasion resistance and resistance to change in gloss or flatness when subjected to elevated temperatures.

It will be appreciated that various modifications and changes may be made in the compositions of the invention by those skilled in the art in addition to those set forth above without departing from the essence of the invention and that accordingly the invention will be limited only within the scope of the appended claims.

What is claimed is:

1. A flatting agent consisting of discrete particles having a fine size range from about 0.02 to about 10 microns of the in situ prepared cross-linked reaction product of
    a. a crystalline, thermoplastic polar nylon or polyester organic polymer containing reactive hydrogen groups and having a softening point of from about 120° to about 240°C. which is insoluble in common coating solvents for film-forming organic binders and soluble only at elevated temperatures in strong organic solvents for said organic polymer and
    b. a cross-linking agent chemically reactive with said organic polymer and containing chemically reactive isocyanate or methylol groups.

2. The flatting agent defined by claim 1 wherein the discrete particles are the cross-linked reaction product of (a) an ethylene glycol terephthalate-isophthalate polyester and (b) an isocyanate-terminated polyester.

3. The flatting agent defined by claim 1 wherein the discrete particles are the cross-linked reaction product of (a) an ethylene glycol terephthalate-isophthalate-sebacate polyester and (b) hexamethylol melamine.

4. The flatting agent defined by claim 1 wherein the discrete particles are the cross-linked reaction product of (a) nylon-6,10 and (b) hexamethylene diisocyanate trimer.

5. A flatting agent dispersion consisting of the discrete particles defined by claim 1 dispersed in an inert liquid dispersion medium comprising c. a common coating solvent for a compatible film-forming organic binder in which said organic polymer and said cross-linked reaction product are insoluble and
d. a strong organic solvent for said organic polymer in which the organic polymer is soluble only at elevated temperatures and in which said cross-linked reaction product is insoluble.

* * * * *